United States Patent
Funazaki et al.

[11] Patent Number: 6,124,969
[45] Date of Patent: Sep. 26, 2000

[54] REAR PROJECTION TYPE IMAGE DISPLAY DEVICE

[75] Inventors: Kazuo Funazaki; Hideki Kobayashi, both of Nakajho-machi, Japan

[73] Assignee: Kuraray Co., Ltd., Kurashiki, Japan

[21] Appl. No.: 09/130,107

[22] Filed: Aug. 6, 1998

[30] Foreign Application Priority Data

Aug. 8, 1997 [JP] Japan .................................. 9-214913

[51] Int. Cl.$^7$ .................................................. G03B 21/60
[52] U.S. Cl. ........................................ 359/456; 359/457
[58] Field of Search .................................. 359/443, 453, 359/455, 456, 457, 460, 619, 625

[56] References Cited

U.S. PATENT DOCUMENTS

| | | | |
|---|---|---|---|
| 5,513,037 | 4/1996 | Yoshida et al. | 359/457 |
| 5,592,332 | 1/1997 | Nishio et al. | 359/619 |
| 5,661,600 | 8/1997 | Mitani et al. | 359/457 |
| 5,870,225 | 2/1999 | Ogino et al. | 359/457 |
| 5,880,887 | 3/1999 | Goto | 359/626 |

*Primary Examiner*—David M. Gray
*Assistant Examiner*—Christopher E. Mahoney
*Attorney, Agent, or Firm*—Oblon, Spivak, McClelland, Maier & Neustadt, P.C.

[57] ABSTRACT

A rear projection type image display device includes a single projection lens, a Fresnel lens sheet, and a lenticular lens sheet 4 having black stripes in an area where when the light entered through the Fresnel lens sheet is transmitted, the outgoing light does not pass. When the angle (deg) of incidence to the lenticular lens sheet 4 is taken to be $\theta$, the total light transmittance (%) of the lenticular lens sheet to the light with the angle $\theta$ of incidence is taken to be $Tt(\theta)$, and the light transmittance loss by a light absorbent contained in the lenticular lens sheet is taken to be $\alpha$, as shown by (b), (c) in FIG. 4, in the central part of the lenticular lens sheet, if $|\theta|=5$, the expression $Tt(\theta)>70\times(1-\alpha)$ is satisfied, and if $|\theta|=20$, the expression $Tt(\theta)<50\times(1-\alpha)$ is satisfied.

3 Claims, 6 Drawing Sheets

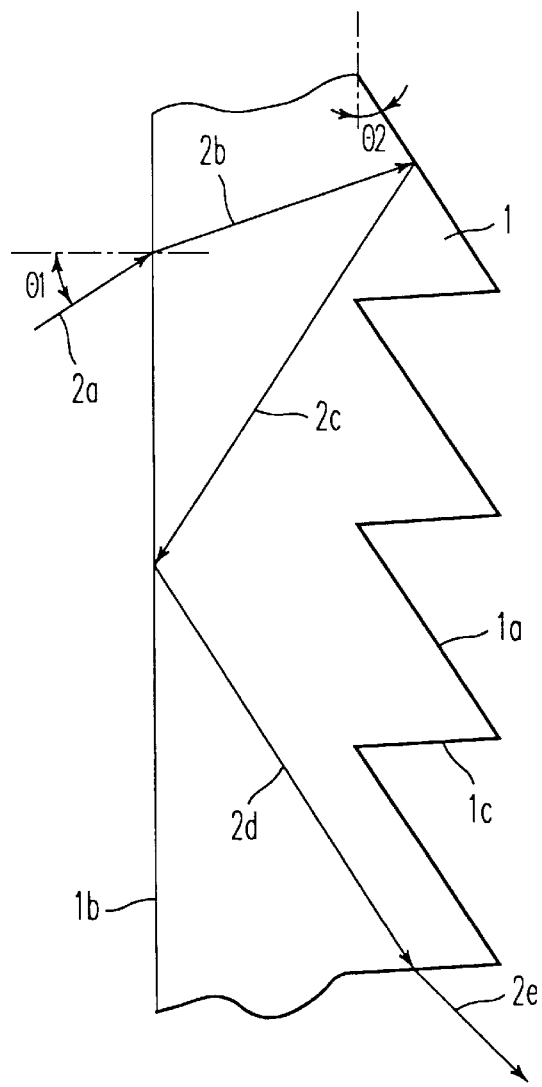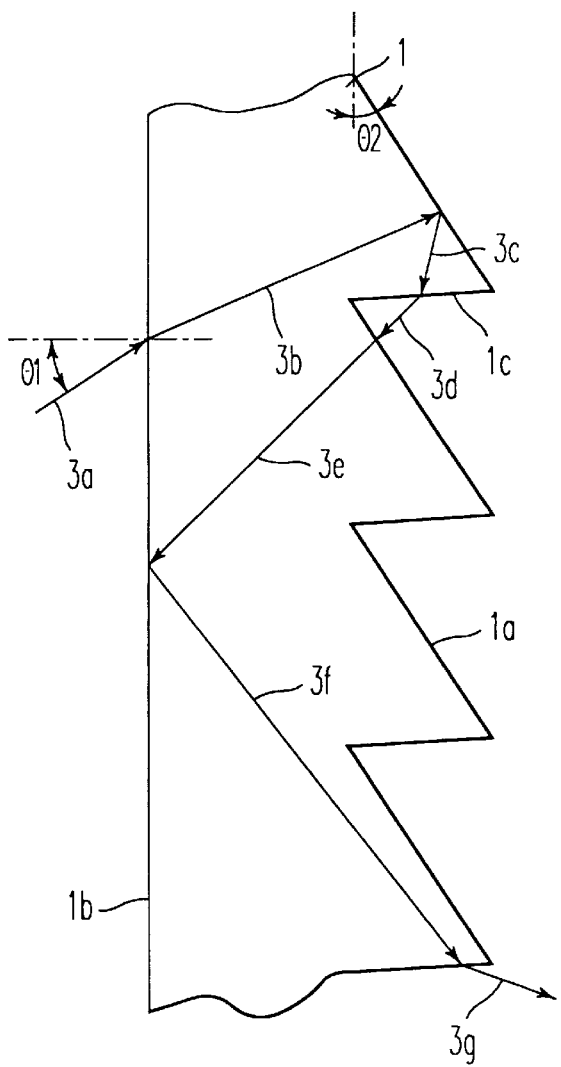
*FIG. 1*　　　*FIG. 2*

REAR PROJECTION TYPE IMAGE DISPLAY DEVICE

BACKGROUND OF THE INVENTION

1. Field of the Invention

This invention relates to a rear projection type image display device using one or more liquid crystal panels or the like, comprising a single projection lens and a screen.

2. Description of Related Art

As a transmission type screen of a rear projection type image display device using one or more liquid crystal panels or the like, which is provided with a projector comprising a single lens, the transmission type screen constructed as shown in FIG. 10 has been used heretofore. In this type screen, there are a Fresnel lens sheet 11 having a Fresnel lens on the surface of a transparent resin plate, a lenticular lens sheet 12 having semicylindrical convex lenses repeatedly formed in the horizontal direction on both sides thereof, and a front plate 13 using for the purpose of protecting the lenticular lens sheet or the like.

In the screen shown in FIG. 10, a fine particles diffuser of quartz, glass, polymer or the like is mixed with the lenticular lens sheet 12 in order to increase the vertical angle of visibility in addition to the horizontal angle of visibility. Further, the fine particles diffuser is similarly dispersed in the Fresnel lens sheet 11 for the same purpose.

However, the conventional transmission type screen has problems in respect of distinction and contrast of an image. It is known that as one cause for degrading the distinction and contrast of an image, cited is the so-called ghost light such as stray light, which is unnecessary reflected light or the like generated from members for forming a projection optical system such as a projection light source, an enlargement lens, a Fresnel lens sheet and so on. Conventionally, in order to reduce the stray light or the unnecessary reflected light, members for forming a projection optical system have been painted black, and also the surface of the non-lens surface (e.g. the opposite surface to the lens surface of the Fresnel lens, the rise surface or the like) of the Fresnel lens has been roughened, but the effects could not been satisfied.

As another cause for degrading the distinction and contrast of an image, cited is that the outside daylight such as interior lighting or the like is reflected in the inside of a lenticular lens or on the surface thereof. As shown in FIG. 11, the outside daylight 14 incident from the observing surface side (opposite side to the projector) is diffusion-reflected by a fine particles diffuser 15, and the diffusion-reflected light 16 is returned to the observer side, so that the whole surface of a screen becomes white to degrade the contrast of an image projected from an image source.

In order to solve the problem that the distinction of an image and the contrast of an image are low, as disclosed in Japan Patent Laid-Open No. 49-12943, Japan Patent Laid-Open No. 58-59436, and Japan Patent Laid-Open No. 58-134627, black stripes 17 as a light shielding member has been provided on the surface of the observing surface side of the lenticular lens sheet 12 (See FIG. 11).

In this case, if the black stripe ratio (the ratio of the black stripe width to the lenticular lens pitch) is high, it is apparent that the degree of degradation of contrast due to outside daylight becomes lower. But in a three-CRTs image display device, angles of incidence on the lenticular lens sheet from three tubes are different, so a color shift correction is required because light from the respective projection tube is converged on each of different positions of an outgoing lens of the lenticular lens sheet. Accordingly, the black stripe ratio is generally 50% or less.

SUMMARY OF THE INVENTION

This invention has been proposed in order to solve the above problems, and it is, accordingly, an object of the invention to provide a rear projection type image display device having a transmission type screen with excellent contrast, in which stray light or unnecessary reflected light in a projection optical system can be reduced and light produced by reflection of outside daylight can be reduced.

The rear projection type image display device of the present invention for solving the above problems comprises a single projection lens, a Fresnel lens sheet, and a lenticular lens sheet having a light shielding member such as black stripes or the like in an area where when the light entered through the Fresnel lens is transmitted, the outgoing light does not pass, wherein when the angle (deg) of incidence to the lenticular lens sheet is taken to be $\theta$, the total light transmittance (%) of the lenticular lens sheet to the light with the angle $\theta$ of incidence is taken to be $Tt(\theta)$, and the light transmittance loss by a light absorbent contained in the lenticular lens sheet is taken to be $\alpha$, in the central part of the lenticular lens sheet, $Tt(\theta)$ and $\alpha$ satisfy the following expressions (1) and (2):

(1) if $|\theta|=5$, the expression $Tt(\theta)>70\times(1-\alpha)$; and
(2) if $|\theta|=20$, the expression $Tt(\theta)<50\times(1-\alpha)$.

In the case of the lenticular lens sheet in the present invention, it is preferable that when the main focal distance (mm) of the incidence side lens in the lenticular lens sheet is taken to be (f) and the distance (mm) between the top of the incidence side lens surface and the top of the light shielding member is taken to be (t), (f) and (t) satisfy the following expression, (3): $0.7 \leq t/f \leq 1.2$ because more bright screen can be obtained.

Further it is preferable that the width of a light shielding member to the pitch of the incidence side lens in the lenticular lens sheet is 60% or more because stray light or unnecessary light can be reduced more effectively and reflection of outside daylight is remarkably lowered.

BRIEF DESCRIPTION OF THE DRAWINGS

Features and other objects of the invention will be more apparent from the detailed description of preferred embodiments with reference to the accompanying in which:

FIG. 1 is a diagram for explaining ghost light transmitted from a Fresnel lens sheet;

FIG. 2 is another diagram for explaining ghost light transmitted from a Fresnel lens sheet;

DETAILED DESCRIPTION OF THE PREFERRED EMBODIMENTS

Figure 3:
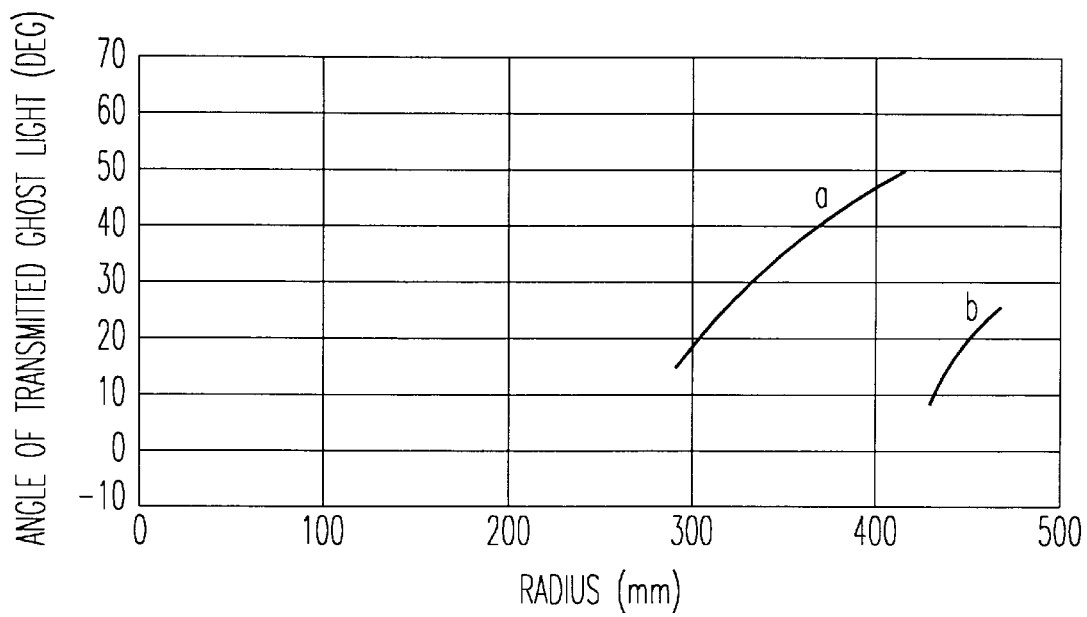
FIG. 3 is a diagram showing the position of ghost light transmitted from a Fresnel lens sheet.

The construction of a rear projection type image display device of the present invention will now be described concretely with reference to the attached drawings.

The reason for the generation of ghost light (stray light, unnecessary reflected light) in the conventional screen comprising, in combination, a Fresnel lens sheet and a lenticular lens sheet will now be described. FIGS. 1 and 2 show optical paths of the so-called ghost light (stray light, unnecessary reflected light) generated from a Fresnel lens or the like which causes the deterioration of contrast of a screen in a dark room. As the result of light ray analysis is shown in FIG. 1, light 2a incident upon a Fresnel lens sheet 1 is refracted (2b) to reach the Fresnel lens 1a surface, the reflected light 2c on the Fresnel lens 1a surface is total-reflected (2d) on the back 1b of the Fresnel lens sheet, light 2e is transmitted on the observation side from a rise surface 1c, and the light 2e becomes ghost light. Or as the result of light ray analysis is shown in FIG. 2, light 3a incident on the Fresnel lens sheet 1 is refracted (3b) to reach the Fresnel lens surface 1a, reflected light 3c on the Fresnel lens surface 1a is transmitted from a rise surface 1a, the outgoing light 3d again enters (3e) the Fresnel lens sheet 1 from the Fresnel lens surface 1a to be total-reflected (3f) on the back 1b of the Fresnel lens sheet, light 3g is transmitted from the rise surface 1c to the observation side, and the light 3g becomes ghost light.

In here, under the condition of causing total reflection on the back of the Fresnel lens sheet, ghost light is seen intensely from the observation side. The ghost light is observed intensely when the angle of incidence of incident light on the Fresnel lens sheet ($\theta 1$ shown in FIGS. 1 and 2) and the Fresnel angle ($\theta 2$ shown in FIGS. 1 and 2) of the Fresnel lens meet a certain specified condition.

As a result of examining the condition by calculation, it is found that as an example, when the size of a screen where an image is projected is 60 inch and the distance from the pupil of a projection lens to the Fresnel lens sheet is 1078 mm, if the Fresnel angle $\theta 2$ of the Fresnel lens satisfies the following expression, ghost light is observed intensely.

$$\theta 2 = \tan^{-1} (CR/[1+\{1-(K+1)C^2R^2\}^{1/2}]+4DR^3+6ER^5+8FR^7+10GR^9$$

C=1.98E−3, K=−1.05, D=E=F=G=0, where R is the radius from the Fresnel center.

The condition of generating ghost light will be described by FIG. 3. The axis of abscissas indicates the distance (mm) from the mechanical center of a screen, and the axis of ordinates indicates the outgoing angle (deg) of ghost light to the perpendicular line of the screen. When the described conditions are satisfied, ghost light transmitted from the Fresnel lens sheet is, as seen from FIG. 3, generated only in the outer periphery of the Fresnel lens sheet, and the outgoing angle is directed toward the center of the Fresnel lens sheet. In FIG. 3, a curve (a) shows ghost light (2e) tracing a light ray as shown in FIG. 1, and a curve (b) shows ghost light (3g) tracing a light ray as shown in FIG. 2.

As described above, the ghost light to be observed only at a specified position in the outer periphery of a screen is actually observed in a wider range than this. This circumstance is significantly influenced by the characteristic of a lenticular lens sheet used jointly with the Fresnel lens sheet. As in the lenticular lens sheet, the outgoing light from the Fresnel lens sheet is diffused largely in the horizontal direction, even the light transmitted from the Fresnel lens sheet only to a specified angle is diffused in the horizontal direction after passed through the lenticular lens sheet, so that ghost light is observed in a wider angle than that shown in FIG. 3.

Figure 4:
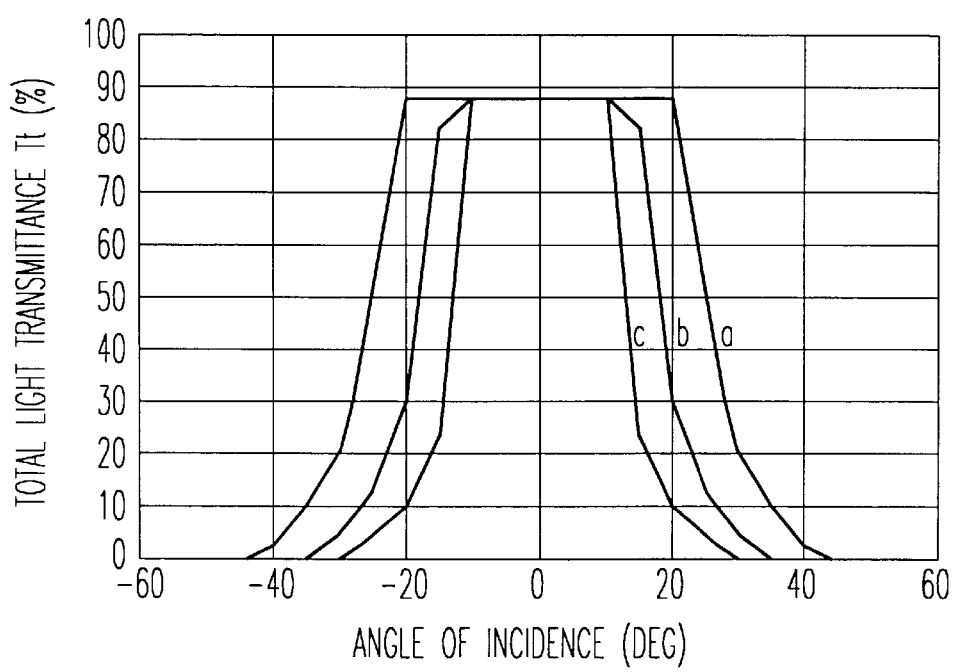
FIG. 4 is a diagram in which the relationship between the angle of incidence on a lenticular lens sheet and the total light transmittance is obtained.
Figure 5:
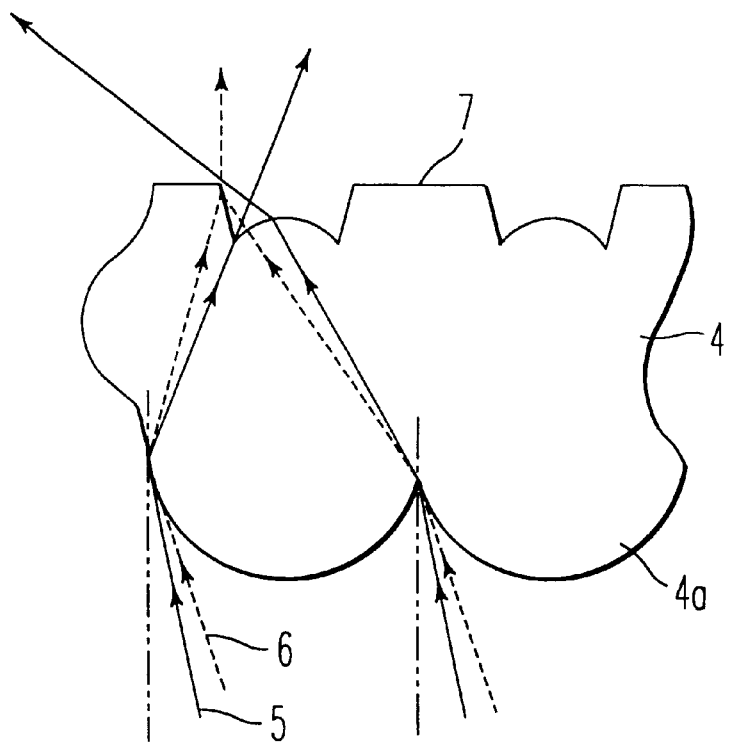
FIG. 5 is a diagram for explaining the transmission paths of light rays in the conventional lenticular lens sheet.

The calculation results of light transmittance to the angle of incidence of the conventional lenticular lens are shown in a graph (a) of FIG. 4. In FIG. 4, the axis of ordinates indicates the total light transmittance Tt(%) of the lenticular lens sheet, and the axis of abscissas indicates the angle $\theta$(deg) of incidence of a light ray on the lenticular lens. As shown in the graph (a) of FIG. 4, in the conventional lenticular lens sheet, when the angle of incidence is in the range of 0° to 20°, the total light transmittance Tt is about 90%, so that the ghost light shown in FIG. 3 is easily transmitted. On the other hand, the ghost light transmitted from the Fresnel lens sheet at a larger outgoing angle (above 30°) does not come out on the observation side. This phenomenon will be described with reference to FIG. 5. In FIG. 5, a light ray 5 (a solid line) indicates an incident light ray with an incidence angle of 20°, and a light ray 6 (a broken line) indicates an incident light ray with an incidence angle of 30°. As the light ray tracing result is shown in FIG. 5, the light entered the incidence side lens 4a of the lenticular lens sheet 4 at an angle above a certain angle (above 30°) strikes black stripes 7 formed on the outgoing side of the lenticular lens sheet 3 not to come out on the observation side.

Accordingly, in the conventional screen comprising, in combination, a Fresnel lens sheet and a lenticular lens sheet, the ghost light (stray light, unnecessary reflected light) generated by reflection in the interior of the Fresnel lens sheet is observed only at a certain specified position of the screen, and though the intensity varies, even if the observation position is changed, the position on the screen will not be changed.

The generation status of ghost light in the rear projection type image display device of the present invention will now be described.

Though in the rear projection type image display device of the present invention, the generation status of ghost light in the Fresnel lens sheet is the same as that in the prior art, in the lenticular lens sheet in the present invention, the transmittance characteristic of outgoing light ray to the angle of an incident light ray is largely different from that of the prior art. In the conventional lenticular lens sheet, even if the angle of incidence is 200° or above, a light ray is transmitted to the observation side, but in the lenticular lens sheet in the present invention, the transmittance is about 50% or less.

In the case of combining such a lenticular lens sheet in the present invention with the same Fresnel lens sheet as that of the prior art, an area observed as ghost light is remarkably reduced. In the screen outer peripheral part, the angle of incidence of ghost light on the lenticular lens sheet is large, and if it is the lenticular lens sheet of the present invention, the effect of reducing ghost light is especially large. In order to further reduce ghost light, it is preferable that transmittance with an incidence angle of 20° or less is further lower, and it is preferable that the transmittance is 30% or less.

Figure 6:
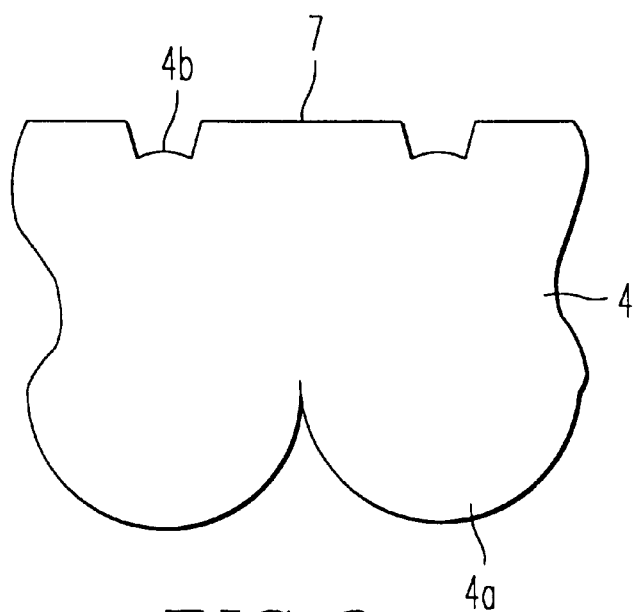
FIG. 6 is a sectional view of a lenticular lens sheet in the present invention.
Figure 7:
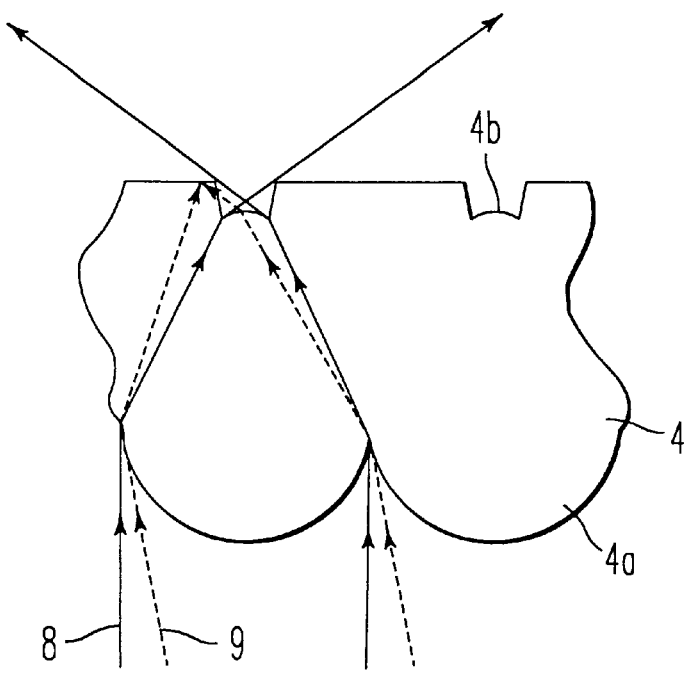
FIG. 7 is a diagram for explaining the condition where unnecessary incident light is cut in the lenticular lens of the present invention.

FIG. 6 shows the construction of the lenticular lens sheet in the present invention. An incidence side lens 4a and an outgoing side lens 4b of the lenticular lens sheet 4 in the present invention are elliptical or circular sectional forms similarly to the conventional lenticular lens sheet. As described before, in the conventional lenticular lens sheet, light rays incident at a large angle are as shown by a light ray 5 (a solid line) and a light ray 6 (a broken line) in FIG. 5, have only some (the light ray 6) thereof cut by black stripes 7. FIG. 7 shows the condition where a light ray is transmitted in the lenticular lens sheet in the present invention. In FIG. 7, a light ray 8 (a solid line) indicates a path with an incidence angle of 0°, and a light ray 9 (a broken line) indicates a path with an incidence angle of 20°. As shown by the light ray 9 (a broken line) in FIG. 7, according to the present invention, a light ray with an incidence angle 20° is also cut by the black stripes 7 in the lenticular lens sheet to remarkably reduce unnecessary incident light ray which causes ghost.

FIG. 4 shows the results of calculating the total light ray transmittance of an example of a lenticular lens sheet in the present invention. In FIG. 4, graphs (b) and (c) are results of calculating the total light ray transmittance of an example of the lenticular lens sheet in the present invention. As shown in the graphs (b) and (c) of FIG. 4, it is known that stray light with an angle of 20° or more transmitted from the Fresnel lens sheet is hardly transmitted.

Figure 8:
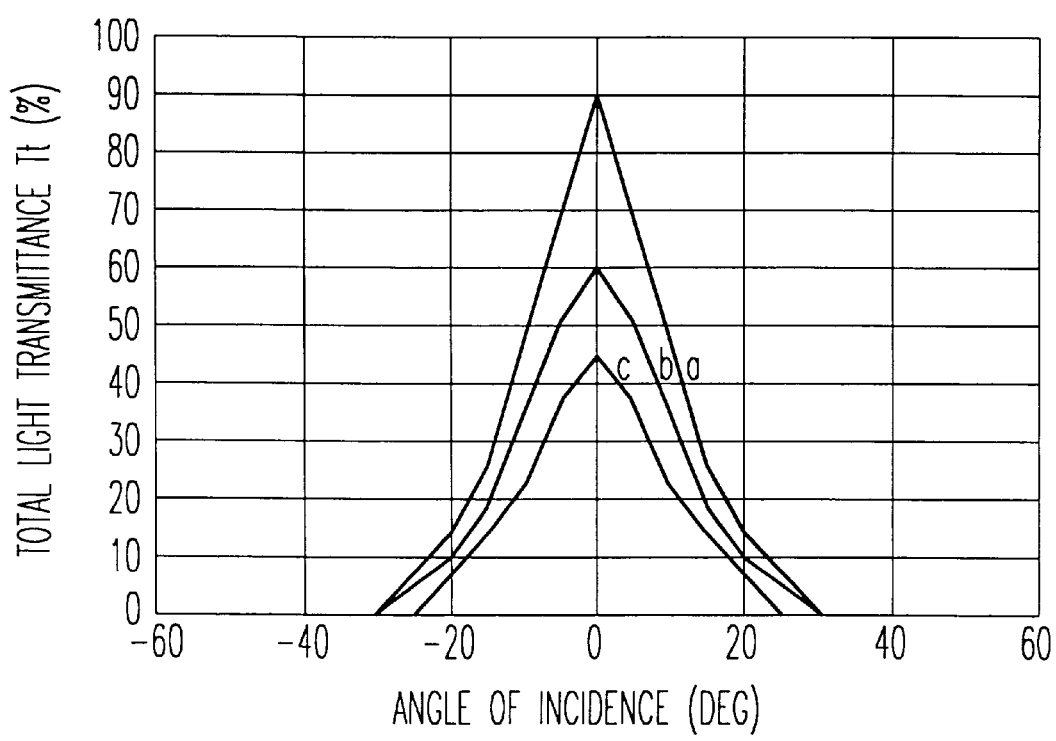
FIG. 8 is a diagram in which the relationship between the angle of incidence upon the lenticular lens and the total light transmittance is obtained concerning different black stripe ratios.

The light transmittance of an unnecessary reflected light ray from the Fresnel lens sheet is significantly influence by the position of the outgoing side lens to the main focus position of the incidence side lens. This circumstance will be described with reference to FIG. 8. The axis of ordinates indicates the total light transmittance Tt(%) of the lenticular lens sheet, and the axis of abscissas indicates the angle θ (deg) of incidence of a light ray on the lenticular lens sheet. FIG. 8 shows the calculation results if t/f is 1.6 when the main focal distance (mm) of the incidence side lens in the lenticular lens sheet is indicated by (f) and the distance between the incidence side lens surface and a light shielding member is indicated by (t), and in the graphs (a), (b) and (c) of FIG. 8, the respective ratios (hereinafter referred to as BS ratio) of the width of the light shielding member to the pitch of the incidence side lens are 45%, 60% and 70% (provided that calculation was done, taking the light transmission loss caused by a light absorbent contained in the lenticular lens sheet as 0%.). If the position of the outgoing side lens is remote from the main focus position of the incidence side lens designed to keep the practical horizontal angle of visibility, it is possible to remarkably lower the light transmittance to a light ray with a large incidence angle on the lenticular lens sheet. However, the light transmittance of a light ray which has an incidence angle of about 0° and is needed for displaying an image is also lowered, so that a desirable characteristic as a lenticular lens sheet can not be obtained. Further, if the position of the outgoing side lens to the main focus position of the incidence side lens is remote, the horizontal diffusion characteristic which is important as a characteristic of a lenticular lens is lowered, so it is not preferable in this respect. On the other hand, also in the case where the position of the outgoing side lens to the main focus position of the incidence side lens is too short, similarly even the transmittance of a light ray needed for displaying an image is lowered so that a desirable characteristic as a lenticular lens sheet can not be obtained.

When the main focal distance (mm) of an incidence side lens in a lenticular lens sheet is indicated by (f) and the distance (mm) between the incidence side lens surface and a light shielding member is indicated by (t), the results of varying the value of t/f and the ratio of the width of the light shielding member to the pitch of the incidence side lens to calculate the relationship of the total light transmittance (Tt) of the lenticular lens sheet are shown in Table 1 and Table 2. In the table 1, the angle of incidence of a light ray on the lenticular lens is taken as 5°, and in the Table 2, the angle of incidence of a light ray on the lenticular lens is taken as 20°.

TABLE 1

| | BS ratio | | |
|---|---|---|---|
| t/f | 45% | 60% | 70% |
| 0.6 | 65% | 65% | 58% |
| 0.7 | 73% | 73% | 68% |
| 0.8 | 79% | 79% | 78% |
| 0.9 | 89% | 89% | 89% |
| 1.1 | 91% | 91% | 91% |
| 1.2 | 91% | 91% | 91% |
| 1.6 | 72% | 51% | 37% |

TABLE 2

| | BS ratio | | |
|---|---|---|---|
| t/f | 45% | 60% | 70% |
| 0.6 | 69% | 52% | 38% |
| 0.7 | 77% | 52% | 35% |
| 0.8 | 84% | 47% | 29% |
| 0.9 | 88% | 29% | 11% |
| 1.1 | 47% | 11% | 3% |
| 1.2 | 22% | 8% | 5% |
| 1.6 | 14% | 10% | 8% |

As shown in Table 1, under the condition that the angle of incidence of a light ray on a lenticular lens sheet is 5°, when t/f ranges from 0.7 to 1.2, the total light transmittance is 70% or more. As shown in Table 2, under the condition that the angle of incidence of a light ray on a lenticular lens is 20°, when t/f ranges from 0.9 or more, the total light transmittance is 50% or less.

That is, when the main focal distance (mm) of an incidence side lens in a lenticular lens sheet is indicated by (f), and the distance (mm) between the incidence side lens surface and a light shielding member is indicated by (t), if t/f is in the range of 0.7 to 1.2, the angle θ(deg) of incidence of a light ray on the lenticular lens, the total light transmittance Tt(θ) (%) of the lenticular lens sheet, and the light transmittance loss α by a light absorbent contained in the lenticular lens sheet are such that, if $|\theta|=5$ (deg), the expression $Tt(\theta)>70\times(1-\alpha)$ can be satisfied, and if $|\theta|=20$ (deg), the expression $Tt(\theta)<50\times(1-\alpha)$ (%) can be attained. By such a lenticular lens sheet, ghost light such as stray light, unnecessary reflected light or the like generated from a Fresnel lens sheet can be remarkably reduced.

As described above, in order to reduce ghost light from the Fresnel lens sheet or the like, it is preferable that the total light transmittance to a light ray with an incidence angle of 20° on the lenticular lens sheet is low, and if the transmittance is $50\times(1-\alpha)$ (%) or less, the ghost light can be remarkably reduced. It is more desirable that the transmittance is $30\times(1-\alpha)$ (%) or less. However, even in the case of simply decreasing only the transmittance to a light ray with an incidence angle of 20°, the brightness of the lenticular lens sheet is lowered, so it is necessary that the total light transmittance to a light ray with an incidence angle of 5° on the lenticular lens sheet is 70% or more. It is desirable that the total light transmittance to a light ray with an incidence angle of 5° is 80% or more.

In the present invention, the ratio of black stripes can be heightened to reduce outside daylight reflection in a well-lighted room and improve the contrast of a screen. In the 3-CRTs image display device, light rays from three tubes, respectively are different in an angle of incidence on a lenticular lens sheet, so it is necessary to correct color shift caused by converging of light rays from three tubes, respectively on different positions of the outgoing side lens of the lenticular lens sheet. On the other hand, in an image display device using one or more LCDs, which is provided with a single projection lens, it is possible to converge light on a substantially fixed position of an outgoing side lens of the lenticular lens sheet and correction for color shift is not needed, so that the ratio of black stripes can be heightened.

Figure 9:
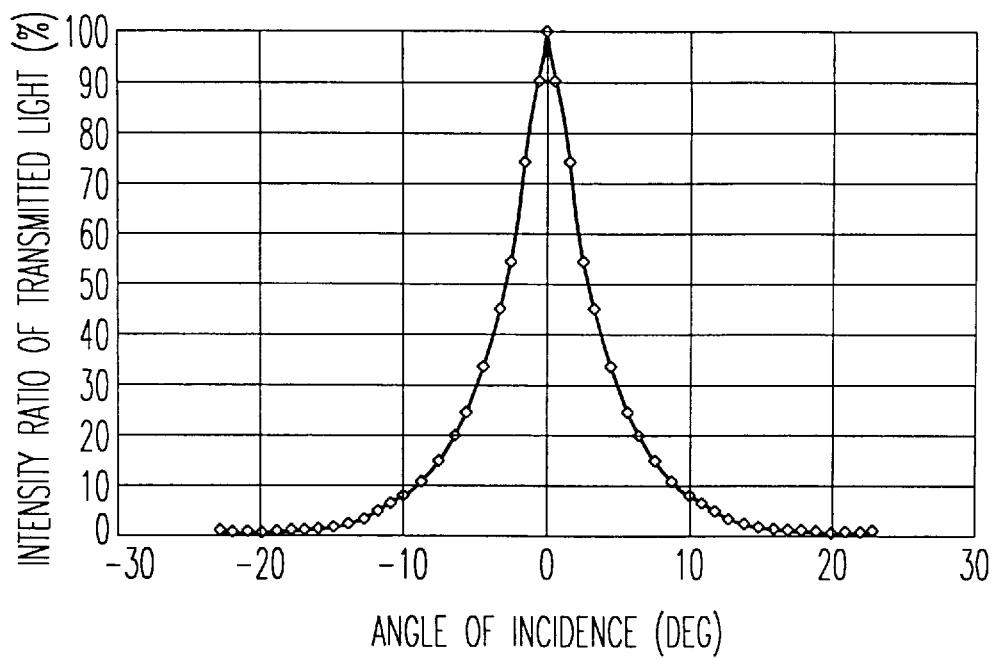
FIG. 9 is a diagram for explaining an example of diffusion characteristic of light rays transmitted from a Fresnel lens sheet.
Figure 10:
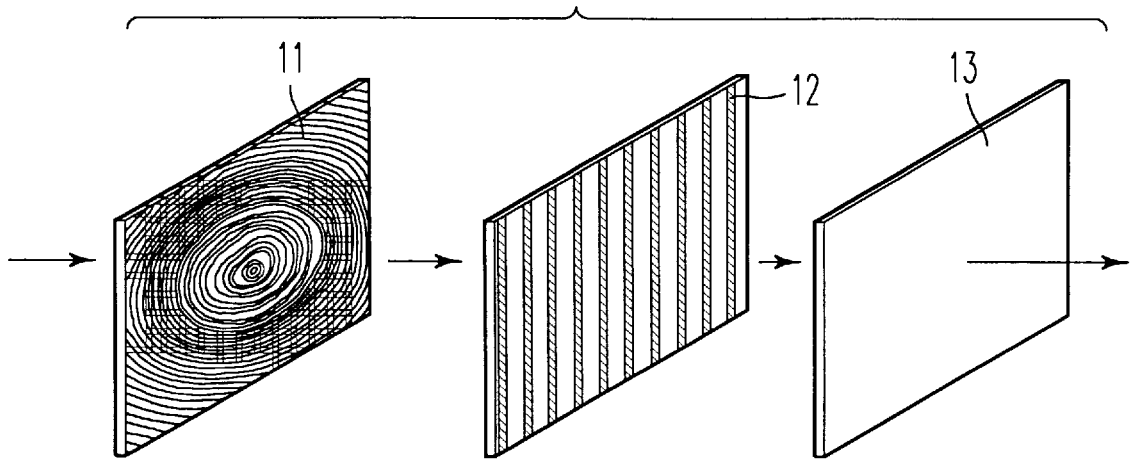
FIG. 10 is a diagram showing an example of construction of a transmission type screen.
Figure 11:
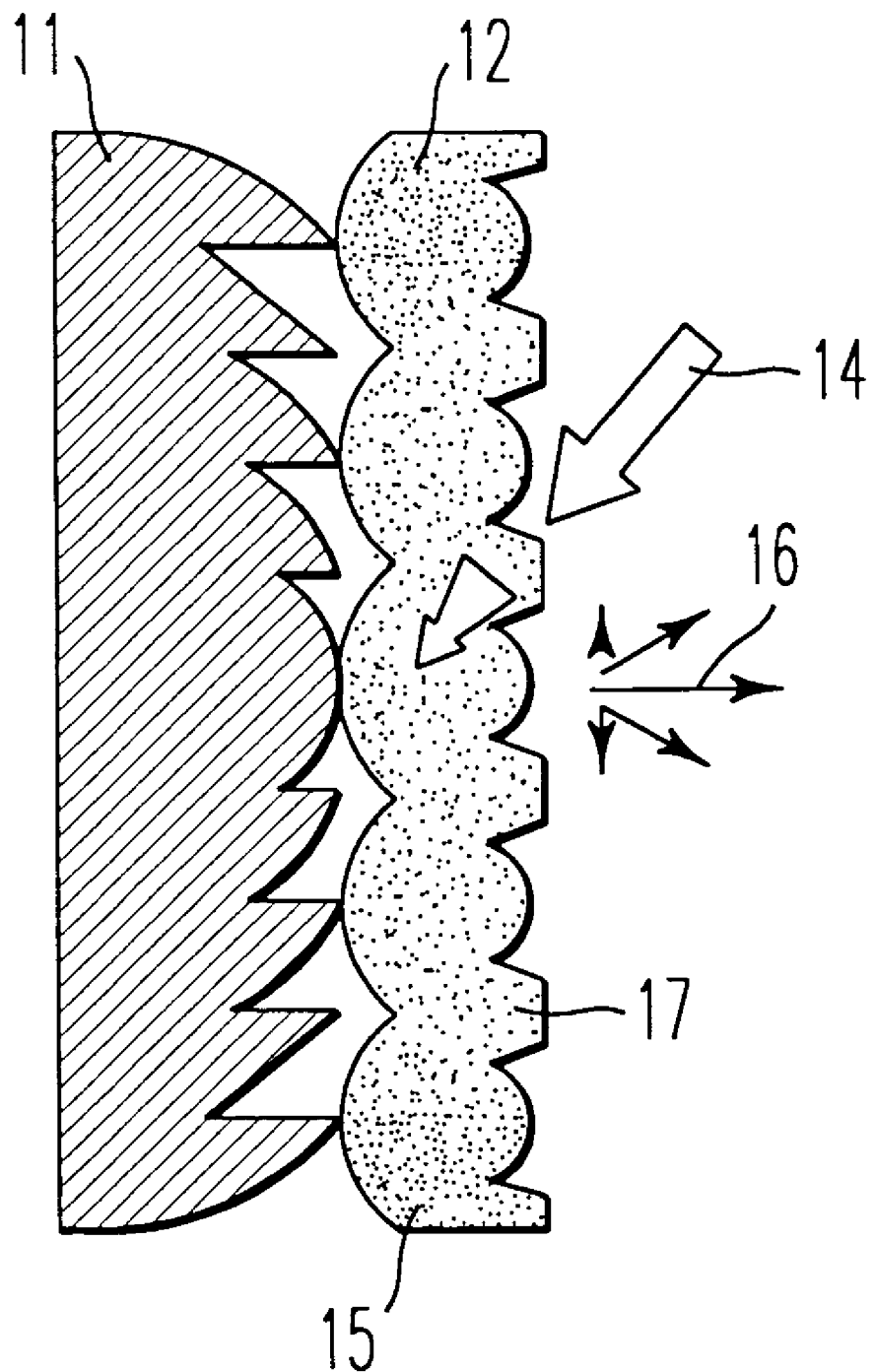
FIG. 11 is a diagram showing the section of a transmission type screen.

A sheet having diffusing power is used as a Fresnel lens sheet, and an example of light ray diffusing characteristics of such a sheet is shown in FIG. 9. As shown in FIG. 9, most of light rays transmitted from the Fresnel lens sheet have an outgoing angle of ±10°. In the lenticular lens sheet of the present invention, when an angle of incidence is 2° or less, the total light transmittance is 50% or more, so even if it is used in combination with the Fresnel lens sheet having diffusing power, there is no problem.

The rear projection type image display device of the present invention will now be described concretely by way of embodiments. In the following embodiments, the total light transmittance is measured by use of GP-1R goniometer manufactured by Murakami Color Laboratory, the contrast is evaluated by use of KL-37HW1 LCD type rear projection type projection television set manufactured by Sony Corporation, and the luminance is measured by a color color-difference meter CS-100 manufactured by Minolta Camera Co., Ltd.

(Embodiment 1)

A lenticular lens sheet so constructed that the lens pitch of a lenticular lens is 0.53 mm, the thickness of a sheet is 0.62 mm, and the ratio of black stripes is 67% is manufactured by a roll molding method using an extrusion molding machine manufactured by Toshiba Machine Co., Ltd. Black stripes are formed with black ink on the surface of this lenticular lens sheet by a screen printing method. The form of the above lenticular lens is expressed by the following expression. t/f is 0.9.

$$(CR^2/[1+\{1-(K+1)C^2R^2\}^{1/2}]+DR^4+ER^6+FR^8+GR^{10}$$

incidence side lens: C=4.5, K=−0.4486, D=E=F=G=0 outgoing side lens: C=−4.5, K=−0.4486, D=E=F=G=0

Where R is the radius from the lenticular lens center.

A Fresnel lens sheet which is combined with the above lenticular lens sheet to construct a rear projection type image display device is formed by a resin plate where a fine-particles diffuser agent is mixed, and the diffusing characteristic of the Fresnel lens sheet is shown in FIG. 9.

The results of measuring the total light transmittance Tt(θ) (%) of the lenticular lens sheet of the present embodiment are shown in Table 3. The total light transmittance is the ratio of the total amount of light rays transmitted from the outgoing surface to the amount of light rays entering from the incident surface of the lenticular lens sheet (In Table 3, measurement result on the embodiment 2 mentioned later is e same time.).

TABLE 3

| Angle of Incidence | Embodiment 1 | Embodiment 2 | Comparative Example 1 |
|---|---|---|---|
| 5 | 89% | 90% | 92% |
| 20 | 8% | 28% | 56% |

The lenticular lens sheet of the present embodiment and the described Fresnel lens sheet are installed in the described projection television set, and the results of measuring the luminance of a projection image and outside daylight reflection which becomes an index of outside daylight contrast are shown in Table 4. In the Table 4, horizontal angles of visibility αH, βH, γH show the horizontal angles of visibility which are ½, ⅓ and ⅟₁₀, respectively to the peak luminance. Both the lenticular lens sheet of the embodiment 1 and that of the embodiment 2 mentioned later have a horizontal angle of visibility which causes no problem practically.

TABLE 4

|  |  | Embpdo. 1 | Embodi. 2 | Compar. ex. 1 |
|---|---|---|---|---|
| Luminance GO |  | 5.9 | 6.0 | 6.1 |
| Hori. Angle of visibility (deg) αH | | 40 | 40 | 38 |
| βH | | 48 | 47 | 47 |
| γH | | 62 | 63 | 64 |
| with interior lighting | Outside daylight contrast | 15 | 10 | 7 |
| No interior lighting | Stray light contrast | 32 | 27 | 18 |

The luminance of a projection image was measured by inputting a reference signal of a black-and-white pattern to a projection television set and measuring the white area by use of the above measuring device at a distance of 1 m away from the projection television set. The outside daylight reflection luminance was measured by applying modulated light of a halogen lamp to a screen at an angle of about 45° from above and measuring the luminance of the black area of the black-and-white pattern. In Table 4, the outside daylight contrast is indicated by a value obtained by dividing the white luminance of a projection image by black luminance. The outside daylight contrast is shows the influence of outside daylight upon the projection image light, and it means that the larger the value is, the less the contrast is deteriorated.

Subsequently, lighting in an evaluation room is put out, a black-and-white reference signal is input to the projection television set to measure the white area luminance and the black area luminance, respectively. The value obtained by dividing the white luminance by the black luminance is taken as stray light contrast. It means that the larger the value is, the less the deterioration of contrast due to stray light is.

(Embodiment 2)

A lenticular lens sheet so constructed that in the expression indicating the lens form of the described lenticular lens sheet, incidence side lens: C=4.5, K=−0.4486, D=E=F=G=0 outgoing side lens: C=−4.5, K=−0.4486, D=E=F=G=0, the lens pitch is 0.53 mm, the thickness of the sheet is 0.62 mm, t/f is 0.9, and the ratio of black stripes is 60%, is manufactured in the same manner as described in the embodiment 1.

The results of measuring the total light transmittance and contrast similarly to the embodiment 1 using the thus constructed lenticular lens sheet are shown at the same time in Table 3 and Table 4.

(Comparative example 1)

A lenticular lens sheet so constructed that in the expression indicating the lens form of the described lenticular lens sheet, incidence side lens: C=4.5, K=−1.0, D=E=F=G=0 outgoing side lens: C=−6.3, K=−1.0, D=E=F=G=0, the lens pitch is 0.55 mm, the thickness of the sheet is 0.67 mm, t/f is 1.0, and the ratio of black stripes is 44%, is manufactured in the same manner as described in the embodiment 1.

The results of measuring the total light transmittance and contrast similarly to the embodiment 1 using the thus constructed lenticular lens sheet are shown at the same time in Table 3 and Table 4. As shown in Table 3, the lenticular lens sheet of the comparative example has a high transmittance to an incidence angle of 20°. In the comparative example, as shown in Table 4, the contrast is inferior to that of the embodiments.

It will be appreciated that according to the present invention, ghost light such as stray light, unnecessary reflected light or the like in a projection optical system, which is generated even if outside daylight does not exist, can be reduced, and also outside daylight reflection in a well-lighted room can be reduced so as to provide a rear projection type image device excellent in contrast.

What is claimed is:

1. A rear projection type image display device comprises a single projection lens, a Fresnel lens sheet, and a lenticular lens sheet having a light shielding member in an area where when the light entered through said Fresnel lens sheet is transmitted, the outgoing light does not pass, wherein when the angle (deg) of incidence to said lenticular lens sheet is taken to be $\theta$, the total light transmittance (%) of said lenticular lens sheet to the light with the angle $\theta$ of incidence is taken to be $Tt(\theta)$, and the light transmittance loss by a light absorbent contained in said lenticular lens sheet is taken to be $\alpha$, in the central part of said lenticular lens sheet, $Tt(\theta)$ and $\alpha$ satisfy the following expressions (1) and (2):

(1) if $|\theta|=5$, the expression $Tt(\theta) > \times (1-\alpha)$; and (2) if $|\theta|=20$, the expression $Tt(\theta) < 50 \times (1-\alpha)$.

2. The rear projection type image display device as claimed in claim 1, wherein when the main focal distance (mm) of the incidence side lens in said lenticular lens sheet is taken to be (f) and the distance (mm) between the top of the incidence side lens surface and the top of said light shielding member is taken to be (t), (f) and (t) satisfy the following expression (3), (3): $0.7 \leq t/f \leq 1.2$.

3. The rear projection type image display device as claimed in claim 1, wherein the width of said light shielding member to the pitch of the incidence side lens in said lenticular lens sheet is 60% or more.

* * * * *

UNITED STATES PATENT AND TRADEMARK OFFICE
CERTIFICATE OF CORRECTION

PATENT NO.    : 6,124,969
DATED         : September 26, 2000
INVENTOR(S)   : Kazuo Funazaki et al.

It is certified that error appears in the above-identified patent and that said Letters Patent is hereby corrected as shown below:

Column 10,
Line 14, change "$Tt(\theta) > \times (1-\alpha)$" to -- $Tt(\theta) > 70 \times (1-\alpha)$ --.

Signed and Sealed this

Twelfth Day of April, 2005

JON W. DUDAS
*Director of the United States Patent and Trademark Office*